United States Patent [19]

Hudson et al.

[11] Patent Number: 4,608,153

[45] Date of Patent: Aug. 26, 1986

[54] PROCESS FOR THE REMOVAL OF POLYNUCLEAR AROMATIC HYDROCARBON COMPOUNDS FROM ADMIXTURES OF LIQUID HYDROCARBON COMPOUNDS

[75] Inventors: Carl W. Hudson; Glen P. Hamner, both of Baton Rouge, La.

[73] Assignee: Exxon Research and Engineering Co., Florham Park, N.J.

[21] Appl. No.: 760,961

[22] Filed: Jul. 31, 1985

Related U.S. Application Data

[63] Continuation-in-part of Ser. No. 635,729, Jul. 30, 1984, abandoned.

[51] Int. Cl.$^4$ .................. C10G 45/46; C10G 45/60; C10G 47/12
[52] U.S. Cl. .................. 208/112; 208/121; 208/143
[58] Field of Search ............ 208/112, 121, 287, 143, 208/144

[56] References Cited

U.S. PATENT DOCUMENTS

| | | | |
|---|---|---|---|
| 2,057,971 | 10/1936 | Pfirrmann | 208/112 |
| 2,817,626 | 12/1957 | Mabry, Jr. et al. | 208/112 |
| 3,816,298 | 6/1974 | Aldridge | 208/112 |
| 3,899,543 | 8/1975 | Cosyns et al. | 208/89 |
| 4,067,799 | 1/1978 | Bearden, Jr. et al. | 208/112 |
| 4,421,635 | 12/1983 | Murakami et al. | 208/112 |
| 4,455,218 | 6/1984 | Dymock et al. | 208/50 |

FOREIGN PATENT DOCUMENTS

| | | | |
|---|---|---|---|
| 0161493 | 11/1981 | Japan | 208/112 |
| 0003886 | 1/1982 | Japan | 208/112 |
| 0177346 | 11/1982 | Japan | 208/112 |
| 364043 | 12/1931 | United Kingdom | 208/112 |

Primary Examiner—Andrew H. Metz
Assistant Examiner—O. Chaudhuri
Attorney, Agent, or Firm—Llewellyn A. Proctor

[57] ABSTRACT

A process wherein a feed comprising an admixture of liquid hydrocarbon compounds which includes a polynuclear aromatic hydrocarbon compound, or compounds (PNA's) is contacted in the presence of hydrogen over an iron catalyst at temperature sufficient to selectively hydrogenate and hydrocrack, or destroy the PNA's of the admixture without excessively hydrogenating and hydrocracking the non-PNA's of said feed. The process is particularly applicable for the removal of PNA's from reformates, processed naphthas, and other hydroprocessed streams or the like to achieve a lower and more favorable distribution of PNA's in a motor gasoline pool, and further to remove PNA's from prime fuels and heavier hydrocarbon mixtures.

27 Claims, No Drawings

PROCESS FOR THE REMOVAL OF POLYNUCLEAR AROMATIC HYDROCARBON COMPOUNDS FROM ADMIXTURES OF LIQUID HYDROCARBON COMPOUNDS

RELATED APPLICATIONS

This is a continuation-in-part of Application Ser. No. 635,729, by Carl W. Hudson and Glen P. Hamner, filed July 30, 1984, now abandoned.

Other related applications are: Application Ser. No. 611,859 by Carl W. Hudson, filed May 18, 1984, and Application Ser. No. 760,871 by Carl W. Hudson; Application Ser. No. 760,834, by Carl W. Hudson and Gerald E. Markley; Application Ser. No. 760,894, by Carl W. Hudson and Glen P. Hamner; Application Ser. No. 760,962, by Carl W. Hudson and Glen P. Hamner; and Application Ser. No. 760,835, by Carl. W. Hudson and Glen P. Hamner; filed of even date herewith.

BACKGROUND OF THE INVENTION

I. Field of the Invention

This invention relates to a process for removing polynuclear aromatic hydrocarbons from liquid hydrocarbon mixtures which contain polynuclear aromatic hydrocarbons as an undesirable component(s), or contaminants. In particular, it relates to the removal of polynuclear aromatic hydrocarbons from motor fuels, especially reformates such as used for blending into motor gasoline pools.

II. Background and Prior Art

Gasolines are complex mixtures of hydrocarbons, and include paraffins, naphthenes, olefins, and aromatic hydrocarbons. They contain low boiling components ($C_4$), but the predominant hydrocarbons are those having from about 5 to 12 carbon atoms; more typically from about 5 to about 10 carbon atoms. Generally, gasoline boils within a range of from about 0° C. (32° F.) to about 225° C. (437° F.), or more typically from about 25° C. (77° F.) to about 210° C. (410° F.). Typically, gasoline contains from about 15 vol. % to about 20 vol. % paraffins, naphthenes and branched paraffins, which fall within a range of from about $C_5+$ to about $C_{12}$, from about 15 vol. % to about 20 vol. % of olefins which fall within a range of from about $C_6$ to about $C_{12}$, and from about 60 vol. % to about 70 vol. % of aromatics, the preponderance of which fall within a range of from about $C_6$ to about $C_{12}$. Most of the gasolines that are sold for motor vehicle use are derived from petroleum, but may also be derived in whole or in part from hydrocarbons obtained from synthetic sources.

In general, the octane requirements of internal combustion engines require that the natural, or virgin naphtha, or other light boiling fraction used in making gasoline, be further processed in a catalytic reforming unit to increase the concentration of higher octane components in the mixture. Catalytic reforming, among other things, converts lower octane aliphatic compounds into higher octane aromatic species. The reforming catalyst contains platinum, often accompanied by other promoter and/or modifier metals, supported on a high acidity alumina base, and the process is run under relatively severe process conditions of low hydrogen pressure, e.g., 100–300 pounds per square inch gauge (psig), high liquid feed rates LHSV=2–10, and high temperatures, 450°–510° C. (842°–950° F.). Under such conditions, in the presence of such catalysts, condensation reactions (acid-catalyzed and/or free radical initiated) take place between the aromatic molecules present, or those being formed, to give higher molecular weight, multi-ring aromatic molecules known as polynuclear aromatic (PNA) hydrocarbons. The PNA hydrocarbons, or PNA's, are generally outside the nominal boiling range of gasoline but, because reformate is rarely distilled prior to blending into a refinery's gasoline pool, the PNA's typically end up in commercial motor fuels.

The presence of PNA's in gasoline, often at several hundred to several thousand parts, per million parts by weight of gasoline (ppm), is well known and is believed to contribute to a problem known as "octane requirement increase," or ORI. In very simple terms, ORI is caused by the build-up of carbonaceous deposits in an internal combustion engine which, by limiting heat transfer from the combustion chamber, leads to preignition. Preignition causes the phenomenon known as engine knock or ping. Engine knock is typically "cured" by switching to and burning a higher octane gasoline. Typically, older engines, which have had time to develop significant carbonaceous deposits, require higher octane fuel than that which was used when the engine was new. The PNA's are major contributors to the build-up of carbon deposits in engines which leads to ORI. In particular, ORI increases dramatically with the presence of the high boiling, polycyclic, or multiple-ring aromatic compounds such as naphthalenes (2-rings), phenanthrenes (3-rings), pyrenes (4-rings) and the like. Depending on gasoline composition, the ORI can be as small as 1–2 octane numbers or as great as 10–12 octane numbers ORI tends to be highest in unleaded gasoline, wherein reformate is most commonly blended to provide the required octane levels.

The simplest way to remove PNA's from gasoline is to redistill the processed reformate before adding it to the motor gasoline pool. The PNA's, being higher molecular weight, higher boiling components, will remain in the distillation bottoms fraction while the overhead fraction will be PNA-free. However, since gasoline is sold on a volume basis, the $C_5+$ liquid yield loss associated with such a method for removing the PNA's can become economically unacceptable. This problem is further compounded by the additional energy required to redistill this quantity of material. Thus, there exists a profound need for a simple and economical method for the removal of PNA's from PNA-containing admixtures of liquid hydrocarbons, particularly reformates (and/or naphthas or gasoline) without substantial $C_5+$ liquid yield penalties.

III. Objects

It is, accordingly, an objective of the present invention to fulfill this need; especially by providing a novel process for removing PNA's from PNA-containing liquid hydrocarbon mixtures.

It is, in particular, an object of this invention to provide a novel process for the removal of PNA's from gasoline blending stocks, especially high octane reformates, at relatively low temperatures and low hydrogen partial pressures.

IV. The Invention

These objects and others are achieved in accordance with the present invention embodying a process wherein a feed comprising an admixture of liquid hydrocarbon compounds which includes a polynuclear aromatic hydrocarbon compound, or compounds, is contacted in the presence of hydrogen over an iron catalyst at temperature sufficient to selectively hydrogenate and hydrocrack the polynuclear aromatic hydrocarbon compound, or compounds, of the admixture without excessively hydrogenating and hydrocracking the non-polynuclear aromatic hydrocarbon compound, or compounds, of said feed. The catalyst is characterized as containing elemental iron and one or more of an alkali or alkaline-earth metal [i.e., a Group IA or IIA metal (Periodic Table of the Elements, E. H. Sargent & Co., Copyright 1964 DynaSlide Co.)], or compound thereof, and preferably additionally a Group IIIA metal, or metal compound, particularly aluminum, or compound thereof, sufficient to selectively hydrogenate and hydrocrack the PNA compound, or compounds, or admixture thereof, without excessively hydrogenating and hydrocracking the non-PNA hydrocarbon compound, or compounds, at low temperatures, or temperatures ranging no higher than about 430° C. (806° F.) The catalyst can be supported or unsupported, but in either instance the catalytic surface is one which is constituted essentially of metallic, or elemental iron (Fe°) crystallites about which the alkali or alkaline-earth metals are dispersed, often as a monolayer of an alkaline oxide or alkaline-earth metal oxide. The catalyst is unsulfided, and can function in the presence of sulfur only when a sufficient portion of the catalytic surface of the catalyst is substantially metallic, or elemental iron (Fe°). The formation of sufficiently high concentrations of sulfur at the catalyst surface tends to produce catalyst deactivation via the formation of iron sulfide upon the catalyst surface as a consequence of which the use of feeds which contain high concentrations of sulfur or sulfur compounds should be avoided. High concentration of feed sulfur will soon deactivate the catalyst by converting a major portion of the metallic, or elemental iron surface of the catalyst to iron sulfide. Preferably, the liquid hydrocarbon feed is contacted over the iron catalyst at temperature ranging from about 225° C. (437° F.) to about 430° C. (806° F.), more preferably from about 250° C. (482° F.) to about 350° C. (662° F.), and at hydrogen partial pressures ranging from about 0 psig (one atmosphere or 14.7 psia) to about 1000 psig, preferably from about 100 psig to about 600 psig, sufficient to hydrogenate and hydrocrack, or destroy the PNA's of the admixture of hydrocarbons without excessively hydrogenating and hydrocracking the non-PNA's of said feed. Feeds particularly susceptible to processing in accordance with this invention are PNA-containing admixtures of low sulfur hydrocarbon compounds wherein the high and boiling point of the feed is below about 540° C. (1004° F.), preferably below about 375° C. (707° F.), and more preferably below about 225° C. (437° F.), and the feed is derived from petroleum or a synthetic liquid hydrocarbon admixture obtained from tar sands, coal liquids, shale oil, synthesis gas, methanol or the like. A PNA-containing reformate, whether derived from petroleum naphtha, cracked naphtha, a Fischer-Tropsch naphtha, or the like, is particularly useful as a feed, and very high levels of the PNA's can be removed from such reformates, even when the PNA's are present in relatively high concentrations.

The use of a low sulfur feed is essential, and preferably also the feed should be of relatively low nitrogen content. It was discovered and disclosed in Application Ser. No. 611,859, supra, that relatively low sulfur, nitrogen-containing hydrocarbon feeds could be hydrodenitrogenated over an iron catalyst as described therein, the reaction proceeding via a low hydrogen intensive mechanism at low temperature and pressure. In particular, there was described a process for the selective denitrogenation of nitrogen-containing hydrocarbons, especially one for the selective cleavage, in the presence of hydrogen, of an aryl carbon-nitrogen bond from an aryl nitrogen-containing hydrocarbon without prior saturation with hydrogen of a non-nitrogen containing aryl constituting a portion of said aryl nitrogen-containing hydrocarbon; especially a non-nitrogen containing aryl moiety directly attached to the nitrogen being removed. It has now been discovered that at relatively low nitrogen concentrations, the mechanism of this type of reaction is shifted from one favoring carbon-nitrogen bond cleavage to one favoring carbon-carbon bond cleavage. In conducting the process of this invention, in treating feeds boiling within a range greater than about 375° C. (707° F.) to about 540° C. (1004° F.), it is preferred that nitrogen concentrations greater than about 5000 ppm, preferably greater than about 2000 ppm, and more preferably greater than about 500 ppm be avoided. In treating feeds boiling within a range of greater than about 375° C. (707° F.) to about 540° C. (1004° F.), it is also preferred that sulfur concentrations greater than about 5000 ppm, preferably greater than about 2000 ppm, and more preferably greater than about 500 ppm, be avoided. In treating feeds boiling within the range of greater than about 225° C. (437° F.) to about 375° C. (707° F.), it is preferable that nitrogen concentrations greater than about 5000 ppm, preferably above about 2000 ppm, and more preferably above about 500 ppm, be avoided. In treating feeds boiling within a range greater than from about 225° C. (437° F.) to about 375° C. (707° F.) it is also preferable that sulfur concentrations greater than about 2000 ppm, preferably greater than about 500 ppm, and more preferably greater than about 200 ppm, be avoided. In treating feeds boiling below about 225° C. (437° F.) nitrogen concentrations greater than about 500 ppm, preferably 200 ppm, more preferably about 20 ppm, should be avoided; and in treating such low boiling feeds sulfur levels above about 500 ppm, preferably above about 200 ppm, and more preferably above about 20 ppm should be avoided.

In a preferred embodiment of the invention, a low sulfur, low nitrogen PNA-containing reformate boiling within a range of from about 25° C. (77° F.) to about 225° C. (437° F.) is contacted with hydrogen, or hydrogen-containing gas, over the iron catalyst at reaction conditions sufficient to selectively hydrogenate and hydrocrack out or destroy the PNA's of the feedstock without excessively hydrogenating and hydrocracking the non-PNA molecules of the feedstock. Suitably, the reaction is conducted at temperatures ranging from about 225° C. (437° F.) to about 430° C. (806° F.), preferably from about 250° C. (482° F.) to about 350° C. (662° F.), and under an atmosphere of hydrogen gas or admixture of hydrogen and another gas, or gases within which the hydrogen partial pressure ranges from about 0 psig to about 1000 psig, preferably from about 100 psig to about 600 psig. Some positive pressure of hydrogen is necessary in conducting the reaction, though the hydrogen pressure can thus be at atmospheric pressure, or less. In some instances it can be advantageous to add non-oxiding gases other than hydrogen to the treat gas to modify, improve, or control the reaction, e.g., nitrogen, ammonia, methane, carbon monoxide, carbon dioxide, or the like. The combination of temperature and hydrogen partial pressure are preferably such that a part of the feed, at reaction conditions, is in vapor phase. Temperatures above about 430° C. (806° F.)

generally should not be employed because excessive temperature causes cracking of the feed, and carbon fouling of the catalyst. At temperatures below about 225° C. (437° F.), on the other hand, the temperature is generally inadequate to hydrogenate and hydrocrack the PNA molecules. Total pressures are not critical, but generally range from about 0 psig to about 1200 psig, preferably from about 100 psig to about 750 psig. Treat gas rates, based on hydrogen, range from about 500 to about 10,000 SCF/B, preferably from about 1000 to about 5000 SCF/B. Space velocities range generally from about 0.05 LHSV to about 50 LHSV, preferably from about 0.2 LHSV to about 20 LHSV.

Elemental iron, modified with one or more alkali or alkaline-earth metals, or compounds thereof, is present in the catalyst sufficient to produce on contact with a feed at reaction conditions selective hydrogenation of the PNA molecules and subsequent carbon-carbon bond cleavage of the PNA compounds of the feed without significantly hydrogenating and hydrocracking the non-PNA hydrocarbon components of the feed. In such reactions some portion of the PNA molecules are cracked to produce gas, while the remainder is retained as lower molecular weight liquid aromatic hydrocarbons, with the result that $C_5+$ liquid yield loss is minimal. In the case of a catalytically reformed, high octane motor gasoline blending stock which contains objectionable quantities of PNA's, the selective hydrogenation and hydrocracking of PNA's results in minimum $C_5+$ liquid yield loss and, due to the retention of lower molecular weight liquid aromatic hydrocarbons, there is no observable octane debit. The PNA carbon-carbon bond cleavage reaction occurs over catalysts which contain iron, preferably as the major component, or major metal component. The catalyst may be bulk (unsupported) iron, or iron dispersed upon a support. The unsupported, or bulk iron catalyst is preferred and it may be employed as essentially metallic iron in bulk, or as a bulk iron promoted or modified with alkali or alkaline-earth metals, or the oxides of such metals, exemplary of which are sodium, potassium, cesium, magnesium, calcium, barium, or the like. The active iron catalyst, when a bulk iron catalyst, is preferably one which contains at least 50 percent elemental iron, preferably from about 70 percent to about 98 percent elemental iron, based on the weight of the catalyst. The iron catalyst, when a catalyst wherein the iron is distributed or dispersed upon a support, contains at least about 0.1 percent iron (measured as elemental iron), preferably from about 0.1 percent to about 50 percent iron, and more preferably from about 5 percent to about 25 percent iron, based on the total weight of the catalyst. The supported metallic component, exclusive of the support component, or components, contains at least 50 percent iron (measured as elemental iron), and preferably from about 70 percent to about 98 percent iron.

A bulk fused iron catalyst is preferred. The fused iron is one fused by heating and melting the iron, thus fusing the iron with an alkali or alkaline-earth metal, or metals, or with an alkali or alkaline-earth metal compound, or compounds, which are generally present in concentrations ranging from about 0.01 percent to about 10 percent, preferably from about 0.2 percent to about 4 percent, based on the total weight of catalyst. Sodium, potassium, cesium, magnesium, calcium, and barium are the preferred alkali or alkaline-earth metals. Aluminum, principally as an oxide, or compound thereof, is also a preferred promoter, or modifier, of the fused iron, and it is preferably contained in the catalyst in concentration ranging from about 0.01 percent to about 20 percent, preferably from about 0.5 percent to about 5 percent, calculated as aluminum oxide ($Al_2O_3$), based on the total weight of the catalyst. Other metals, or metal compounds, may also be used as promoters and/or modifiers, such metals including rhenium, nickel, cobalt, palladium, platinum, and copper and their compounds. Such metals or metal compounds may be added to the catalyst alone or admixed one metal with another, or with other metals.

The iron based catalyst, as suggested, may also be supported; preferably upon an inorganic oxide support. Supports include, but are not limited to, the oxides of aluminum, silicon, boron, phosphorous, titanium, zirconium, calcium, magnesium, barium, and mixtures of these and other components. Other supports may include clays, such as bentonite, zeolites, and other alumino-silicate materials, e.g., montmorillionite. Additional supports may be selected from the group of refractory carbides and nitrides of the transition metals of Groups IVB, VB, VIB, VIIB, and Group VIII iron group metals. Alumina, magnesia, and mixtures of alumina and magnesia are preferred supports. The iron based catalysts are prepared by methods which include precipitation, coprecipitation, impregnation, vapor deposition, and the formation of metal complexes (i.e., metal carbonyl, etc.) and the like. The impregnation of a porous inorganic oxide support, such as alumina, with a solution of an iron salt with subsequent drying, calcination and activation by reduction of the supported iron catalyst by contact and treatment of the catalyst with hydrogen, or hydrogen and ammonia, or ammonia in admixture with another reducing gas, or gases, has been found to provide a highly active catalyst for the removal of PNA's from admixtures of liquid hydrocarbon compounds. Impregnation of the support with iron, or iron and other metal promoters or modifiers, by the incipient wetness technique, or technique wherein the iron is contained in solution in measured amount and the entire solution absorbed into the support, subsequently dried, calcined, and activated. The supported iron catalyst can be, and is preferably promoted or modified with alkali or alkaline-earth metals, or oxides of such metals as sodium, potassium, cesium, magnesium, calcium, and barium, or the like. The alkali or alkaline-earth metal, or metals, are generally employed in concentrations ranging from about 0.01 percent to about 10 percent, preferably from about 0.2 percent to about 4 percent, based on the total weight of metal, exclusive of the weight of the support. Sodium, potassium, cesium, magnesium, calcium and barium are the preferred alkali or alkaline-earth metals. Aluminum principally as an oxide, or compound thereof, is also a preferred promoter, or modifier, and it is preferably employed in the catalyst in concentration ranging from about 0.01 percent to about 20 percent, preferably from about 0.5 percent to about 5 percent, calculated as aluminum oxide ($Al_2O_3$), based on the total weight of the supported component, exclusive of the weight of the support. Rhenium, nickel, cobalt, palladium, platinum, and copper, or compounds thereof, can also be added to the catalyst as promoters or modifiers, these metals, or the compounds thereof, generally being added in concentrations ranging from about 0.01 percent to about 10 percent, preferably in concentration ranging from about 0.5 percent to about 2.5 percent, calculated as metallic metal based on the weight of the supported component, exclusive of the weight of the support. After impregnation of the support, the metal impregnated support is dried generally at temperatures ranging from about 65° C. (149° F.) to about 280° C. (536° F.), preferably from about 80° C. (176° F.) to about 110° C. (230° F.) in circulating air, vacuum or microwave oven. The calcination is suitably conducted at temperatures ranging from about 300° C. (572° F.) to about 650° C. (1202° F.), preferably from about 450° C. (842° F.) to about 550° C. (1022° F.).

The iron catalysts can be reduced, activated, or reactivated by contact with hydrogen, by sequential contact with hydrogen and ammonia, or reduced and activated by contact with an admixture of ammonia and hydrogen or by contact with an admixture of ammonia and another reducing gas or gases. The reducing gas and ammonia can be generated in situ or ex situ. The catalysts are more effectively activated if activated by contact with a stream of flowing hydrogen, or by contact with a stream characterized as an admixture of hydrogen and ammonia, or admixture of ammonia and another reducing gas, or gases. In addition, other pretreatment conditions may be used in combination with reduction in order to modify and/or enhance the catalyst. Treatment with a hydrogen rich blend with some carbon containing gas, e.g., carbon monoxide or carbon dioxide, can be used to introduce carbon to the catalyst.

The catalyst is reactivated, after deactivation, by contact with hydrogen, or by contact with ammonia in admixture with hydrogen, or ammonia in admixture with another reducing gas, or gases. Similarly, the activity-maintenance of the catalyst can sometimes be improved during an operating run by introducing ammonia, or ammonia in admixture with another gas, or gases, with the nitrogen-containing feed. In general, the ammonia is employed in admixture with another gas, or gases, in concentration ranging from about 0.01 percent to about 20 percent, preferably from about 0.2 percent to about 10 percent, based on the volume of the gas.

The catalyst is activated, pretreated, or reactivated by contact with the gas, or gaseous admixture, at temperatures ranging from about 300° C. (572° F.) to about 600° C. (1112° F.), preferably from about 400° C. (752° F.) to about 500° C. (932° F.). Suitably pressures range from about 0 psig to about 1200 psig, preferably from about 0 psig to about 1000 psig. Hydrogen partial pressures generally range from about 0 psig to about 1000 psig, preferably from about 100 psig to about 600 psig. Space velocities generally range from about 100 GHSV to about 10,000 GHSV, preferably from about 1000 GHSV to about 5000 GHSV.

Various PNA-containing hydrocarbon feeds can be processed in accordance with the present process to remove PNA's. Thus, the feedstock can be a liquid hydrocarbon derived from petroleum, or a liquid hydrocarbon derived from a synthetic source such as tar sands, coal, oil shale, Fischer-Tropsch liquids or the like, particularly liquids which have a final or high end boiling point of less than about 540° C. (1004° F.). Preferred feed stocks are those which have a final or high end point boiling below about 375° C. (707° F.), more preferably below about 225° C. (437° F.); and include, in particular, reformates produced by reforming naphthas, i.e., virgin petroleum naphtha, straight run gasoline, cracked naphtha, Fischer-Tropsch naphtha or the like, which generally contain PNA's ranging as high as about 3000 parts PNA's, per million parts by weight (ppm) of total hydrocarbons, and not infrequently as high as about 6000 ppm PNA's, or greater, based on total hydrocarbons. In accordance with the process of this invention, on a weight basis, generally at least about 50 percent to about 90 percent, or more, of the PNA's can be removed without excessive methane formation.

The invention will be more fully understood by reference to the following demonstrations and examples which present comparative data obtained from runs illustrating its more salient features. All parts are given in terms of weight except as otherwise specified.

Table I contains some chemical composition and physical characteristic information on two commercial fused iron catalysts used in the following examples. The Katalco 35-4 catalyst on an as received basis is constituted of iron oxides modified by controlled amounts of alumina, calcia, potash, silica, and trace impurities. When reduced, the Katalco 35-4 catalyst becomes a highly active stable ammonia synthesis catalyst. The BASF-R catalyst on as as received basis is constituted primarily of reduced iron metal modified by controlled amounts of alumina, calcia, potash, silica, and trace impurities. The BASF-R catalyst was prereduced, or activated, by the manufacturer in a hydrogen containing gas and then surface stabilized (by mild oxidation) for ease of handling. Prior to use the BASF-R catalyst is prereduced in the reactor with hydrogen at mild conditions or allowed to activate (reduce) on oil at reaction conditions.

TABLE I

Chemical Composition and Physical Characteristics of Commercial Fused Iron Catalysts (as Received)

| | Katalco 35-4 | BASF-R |
|---|---|---|
| I. Chemical Composition, Wt. % | | |
| FeO | 24.5 | <1 |
| $Fe_2O_3$ | 69.1 | <1 |
| Free Fe Metal | Nil | 90–95 |
| Total Fe Oxides | 93.6 | <2 |
| $Al_2O_3$ | 2.5 | 2.0–3.0 |
| $K_2O$ | 0.8 | 0.5–1.0 |
| CaO | 2.0 | 0.5–1.5 |
| $SiO_2$ | 0.4 | <0.5 |
| P | Trace | Trace |
| S as $SO_3$ | Trace | Trace |
| Chloride | <10 ppm | <10 ppm |
| $Fe^{2+}/Fe^{3+}$ | 0.41 | — |
| Other minor impurities | Trace V and Ti | — |
| II. Physical Characteristics | | |
| Bulk Density | | |
| 165 lb/cu ft in oxidized form | | |
| 120 lb/cu ft in reduced form | | |

When using Katalco 35-4, the fused iron catalyst was charged to a reactor, reduced by contact with hydrogen at 450°–470° C. (843°–878° F.) for 12 to 16 hours, and various feeds then passed with hydrogen over the catalyst bed at the reaction conditions subsequently described. When using the BASF-R catalyst, the fused iron catalyst was charged to a reactor, reduced by contact with hydrogen at about 400° C. (752° F.) for 0.5–2 hours or simply allowed to activate on oil as various feeds were passed with hydrogen over the catalyst bed at the reaction conditions subsequently described.

In analyzing the feedstock, and product fractions, for PNA's two different analytical procedures were employed. In PNA Test No. 1, as employed in Examples 1–3 which follow, a packed GC column was employed, and the test was based on standard mixture of multi-ring aromatics compared to an internal standard, triphenylbenzene. Every peak which had a relative retention time (RRT) longer than the RRT of acenaphthene was designated a PNA. The test procedure required that 20 mL of sample be evaporated to a volume of less than 1.0 mL. A known quantity of standard was added and the total volume brought to 1.0 mL with a light boiling solvent. This mixture was then analyzed by gas chromatography. The currently available method for integrating peak areas was found to present a difficulty in assigning proper values due to the lack of separation between the peaks in the PNA region (rough baseline approximations). Thus, the PNA values tended to be overestimated, to give inflated values, especially for samples which contained small amounts of PNA's (less than about 500 ppm).

A variation of this technique, PNA Test No. 2, was also applied using a capillary column which gave much better separation of the PNA peaks of interest. A different standard, phenanthrene, was used. Since phenanthrene is a condensed three-ring aromatic molecule, it is more closely related to the majority of PNA's found (about 75–80% are condensed 3- and 4-ring aromatic compounds). Every peak was called a PNA which had a RRT longer than 9,10-dihydroanthracene (a value close to that for acenaphthene used in PNA Test No. 1). This method has proven to be very consistent and is believed to give more representative values for the PNA levels found in these reformates.

EXAMPLES 1–3

In conducting these runs (Examples 1–3, tabulated in Table III) a ⅜" I.D. stainless steel tubular reactor was employed, the PNA-containing hydrocarbon feed and hydrogen having been cocurrently introduced through a ⅛" inlet line into the top of the reactor and passed downwardly over a fixed bed of Katalco 35-4 fused iron catalyst ground and screened to 50–150 mesh size centered within the reactor. In introducing the PNA-containing hydrocarbon feed, a small positive displacement pump was employed. An infrared furnace was employed to heat the reactor, and the temperature of the reaction was measured by a thermocouple located within the catalyst bed, and controlled by the use of an automatic temperature controller in operative association with the infrared furnace. The product was passed through a bottom adapter and collected in a vented, cooled flask located near the bottom of the reactor. A back pressure regulator was employed to maintain the desired reactor pressure.

The feedstock used in these runs (F1) was a high octane reformate prepared in a reforming pilot unit at low pressure, high recycle conditions during a testing program. This material analyzed as a typical reformate with a RONC (research octane number clear) of 102. Before use for PNA removal testing, it was weathered (left open to the atmosphere), a procedure which increased the RONC to 103.1 and removed the C4-light ends to facilitate making accurate material balances.

Further details on this feed are given in Table II below.

TABLE II

| Feedstock Inspections for F1 | |
|---|---|
| Type | Reformate |
| wppm $H_2O$ | 4 |
| wppm Cl | <0.1 |
| wppm S | <0.1 |
| wppm PNA | 1600 (Test No. 2) |
| | 3000 (Test No. 1) |
| d 60° F. (15.6° C.) g/cc | 0.8305 |
| API Gravity | 38.8 |
| RONC | 103.1 |
| Wt. % Aromatics in $C_5^+$ | 81.5 |
| Molecular Weight | 102.5 |
| Composition, Wt. % | |
| Iso-$C_4$ | 0.05 |
| n-$C_4$ | 0.30 |
| Iso-$C_5$ | 1.42 |
| n-$C_5$ | 1.47 |
| Iso-$C_6$ | 5.99 |
| n-$C_6$ | 2.90 |
| Iso-$C_7$ | 4.13 |
| n-$C_7$ | 0.98 |
| n-$C_8$ | 0.10 |
| $C_8$-$C_{10}$ HC | 1.11 |
| Benzene | 6.75 |
| Toluene | 22.00 |
| Ethyl Benzene | 4.90 |
| Xylenes | 21.72 |
| $C_9+$ Aromatics | 25.15 |

The product collected from the reactor was analyzed by gas chromatography (G.C.) using a packed column to obtain separation of the PNA or multi-ring aromatic peaks, these peaks having been compared to a triphenylbenzene standard (PNA GC Test No. 1).

For Example 1, a 24.3 g/10 mL charge of Katalco 35-4 fused iron catalyst was charged to the reactor and reduced at atmospheric pressure with a 5% $NH_3/H_2$ blend gas flowing at about 300 mL/min at 470° C. (878° F.) for about 2.5 hours. After activation of the catalyst, the flow of the 5% $NH_3/H_2$ gas blend was cut off, and the PNA-containing feed and hydrogen then introduced to the reactor. The initial level of PNA's in feedstock F1 was 3000 ppm as determined by the PNA Test No. 1, supra. The results obtained in conducting the reaction at a hydrogen partial pressure of 100 psig and at various temperatures and space velocities, are shown in Table III. The reduction in PNA concentration in the products is evident.

In Example 2, a 7.43 g/3.0 mL charge of catalyst was reduced as in Example 1 and run at a hydrogen partial pressure of 150 psig, LHSV of 5.6, and at varying temperatures. The conditions are shown in Table III. At the three temperatures tested, the reduction in PNA levels, as can be observed, was quite significant.

In Example 3 the catalyst (7.70 g/3.0 mL) was activated with pure hydrogen flowing at 300 mL/min at 470° C. (878° F.) for 16 hours. Feed and hydrogen were then introduced to the reactor at a hydrogen pressure of 150 psig, an LHSV of 5.5, and temperature of 350° C. (662° F.). Once again the reduction in PNA levels, as shown in Table III, was quite significant.

TABLE III

PNA/Heavies Removal From High Octane Reformate (Feedstock F1) Over Reduced Fused Iron

| | Sample No. | LHSV | Temp. (°C.) | PNA Level Test No. 1 (ppm) |
|---|---|---|---|---|
| Example 1 | | | | |
| Run No.: | 1 | feed | — | — | 3000 |
| Redn. Gas: | 5% $NH_3/H_2$ - | 1-1 | 0.6 | 350 | 160 |
| | 470° C. (878° F.)/ | 1-2 | 1.1 | 300 | 2550 |
| | 2.5 h | | | | |
| Treat Gas: | $H_2$ (100 psig) | 1-3 | 1.0 | 225 | 3150 |
| | | 1-4 | 11.9 | 500 | 965 |
| Example 2 | | | | |
| Run No.: | 2 | feed | — | — | 3000 |

TABLE III-continued

PNA/Heavies Removal From High Octane
Reformate (Feedstock F1) Over Reduced Fused Iron

| | | Sample No. | LHSV | Temp. (°C.) | PNA Level Test No. 1 (ppm) |
|---|---|---|---|---|---|
| Redn. Gas: | 5% $NH_3/H_2$ - | 2-1 | 5.6 | 350 | 180 |
| | 470° C. (878° F.)/ | 2-2 | 5.6 | 370 | 250 |
| | 2.5 h | | | | |
| Treat Gas: | $H_2$ (150 psig) | 2-3 | 5.6 | 385 | 350 |
| EXAMPLE 3 | | | | | |
| Run No.: | 3 | feed | — | — | 3000 |
| Redn. Gas: | $H_2$ only - | 3-1 | 5.5 | 350 | 100 |
| | 470° C. (878° F.)/ | 3-2 | 5.5 | 350 | 190 |
| | 16 h | | | | |
| Treat Gas: | $H_2$ (150 psig) | | | | |

Examples 4 and 5 were conducted in a larger pilot plant unit. This unit included a reactor which allowed the combined feed to be heated before it contacted the catalyst bed. The reactor was constituted of a one-half inch stainless steel tube with a one-eighth inch or one-quarter inch inlet line. A sandbath was used as the heat source. A two-barreled, high pressure syringe pump was used to meter the liquid feed to the reactor. A larger and more efficient product recovery system was used in order to obtain more exacting liquid yields and representative product for analysis. The RONC values were also obtained by a G.C. procedure.

EXAMPLE 4

Feedstock F1 having a total aromatics content of 81.5% and an RONC of 103.1, and which initially contained 1600 ppm PNA's (PNA Test No. 2), was charged at a rate of 20 mL/hour over a 10.0 gm charge of Katalco 35-4 fused iron catalyst (14–35 mesh) at the conditions, and with results given in Table IV.

Analyses of the product were conducted by the use of both PNA Test No. 1 and PNA Test No. 2, and both sets of values are shown in Table IV.

The results illustrate significant reductions (90+%) in PNA levels.

TABLE IV

PNA/Heavies Removal From High Octane Reformate
(Feedstock F1) Over $H_2$ Reduced Fused Iron Run No.: 4
Cat. Redn.: 140 psig $H_2$ (130 mL/min); 470° C. (878° F.)/12 h
Treat Gas: $H_2$ (at 140 psig); 2200 SCF/B
LHSV = 5

| Bal. No. | Run Time (h) | $C_4^-$ by GC (%) | $C_5^+$ LV % | RONC by GC | React. Temp °C. (°F.) | PNA Level, PPM Test No. 1 | PNA Level, PPM Test No. 2 |
|---|---|---|---|---|---|---|---|
| feed | 0 | 0.36 | — | 103.1 | — | 3000 | 1600 |
| 01 | 18 | 0.26 | — | 103.5 | 250(482) | 1561 | 800 |
| 02 | 24 | 0.29 | 99.0 | 103.6 | 300(572) | 643 | 35 |
| 03 | 42 | 0.30 | — | 103.6 | 300 | 447 | — |
| 04 | 48 | 0.31 | 98.4 | 103.5 | 300 | 639 | 25 |
| 05 | 66 | 0.32 | 99.4 | 103.6 | 300 | 453 | 55 |
| 06 | 72 | 0.29 | 99.4 | 103.8 | 300 | 631 | 35 |
| 08 | 144 | 0.29 | 99.4 | 103.7 | 300 | 825 | 95 |
| 09 | 163 | 0.28 | — | 103.7 | 300 | 780 | 120 |
| 10 | 168 | 0.29 | 99.6 | 103.7 | 300 | 963 | 100 |
| 12 | 192 | 0.28 | 99.6 | 103.8 | 300 | 796 | 100 |
| 14 | 216 | 0.29 | 99.5 | 103.8 | 300 | 721 | 105 |
| 16 | 240 | 0.29 | 99.6 | 103.8 | 300 | 811 | 145 |

Other observations were made during the testing, to wit:

Liquid recoveries were 100 ±1% and gas inlet rates equaled gas exit rates within experimental error.

Complete material balances using both GC and MS analyses indicated an average liquid volume yield debit of about 0.4%.

EXAMPLE 5

This run was made with a real feedstock, F2; a stabilized reformate obtained from a commercial reforming unit. This gasoline blending stock is believed to represent the best available material with which to test PNA removal for actual commercial application. An analysis of this feedstock is given in Table V below.

TABLE V

Feedstock Inspections for F2
(Commercial Refinery Reformate)

| Type | Reformate |
|---|---|
| wppm $H_2O$ | 4 |
| wppm Cl | <0.1 |
| wppm S | <0.1 |
| wppm PNA | 800 (Test No. 2) |
| | 2413 (Test No. 1) |
| d 60° F. (15.6° C.) g/cc | 0.8246 |
| API Gravity | 40.1 |
| RONC | 96.0 |
| Wt. % Aromatics in $C_5^+$ | 66.7 |
| Molecular Weight | 100.6 |
| Composition, Wt. % | |
| Iso-$C_4$ | — |
| n-$C_4$ | — |
| Iso-$C_5$ | 1.66 |
| n-$C_5$ | 1.69 |
| Iso-$C_6$ | 10.61 |
| n-$C_6$ | 5.12 |
| Iso-$C_7$ | 8.80 |
| n-$C_7$ | 2.06 |
| n-$C_8$ | 0.38 |
| $C_8$-$C_{10}$ HC | 2.96 |
| Benzene | 8.55 |
| Toluene | 21.33 |
| Ethyl Benzene | 3.30 |
| Xylenes | 17.69 |
| $C_9+$ Aromatics | 15.87 |

The reactor was loaded with 4.0 mL (10.0 g) of Katalco 35-4 fused iron in the 14-35 mesh range. The feed rate was set at 20 mL/h to give a LHSV of 5.0.

The results shown in Table VI, it will be observed, illustrate the effectiveness of fused iron for lowering the PNA level in this reformate. There was less total PNA removal in this test than that seen in Example 4. Yet, the average PNA removal was still about 75-80%, a level which appears to be favorable for decreasing the detrimental effects of ORI. On the other hand, the average $C_5^+$ LV% yields were higher than in Example 4.

TABLE VI

PNA/Heavies Removal From A Commercial Reformate
Over $H_2$ Reduced Fused Iron

Run No.: 5
Cat. Redn.: 140 psig $H_2$ (130 mL/min); 470° C. (878° F.)/15 h
Treat Gas: $H_2$ (at 140 psig); 2200 SCF/B
LHSV = 5

| Bal. No. | Run Time (h) | $C_5^+$ LV % | RONC by GC | React. Temp. (°C.) | PNA Level, PPM Test No. 1 | PNA Level, PPM Test No. 2 |
|---|---|---|---|---|---|---|
| feed | 0 | — | 95.7 | — | 2413 | 800 |
| a | 24 | — | — | 250 | — | — |
| 01 | 41 | — | 96.6 | 300 | | 417 |
| 02 | 48 | 99.8 | 96.4 | 300 | (943)[1] | 154 |
| 04 | 72 | 99.8 | 95.8 | 300 | | 70 |
| 06 | 143 | 99.8 | 96.0 | 300 | | 84 |
| 08 | 149 | 99.8 | 95.6 | 300 | 1229 | 204 |

TABLE VI-continued
PNA/Heavies Removal From A Commercial Reformate Over H₂ Reduced Fused Iron Run No.: 5
Cat. Redn.: 140 psig H₂ (130 mL/min); 470° C. (878° F.)/15 h
Treat Gas: H₂ (at 140 psig); 2200 SCF/B
LHSV = 5

| Bal. No. | Run Time (h) | $C_5^+$ LV % | RONC by GC | React. Temp. (°C.) | PNA Level, PPM Test No. 1 | PNA Level, PPM Test No. 2 |
|---|---|---|---|---|---|---|
| 10 | 172 | 99.8 | 96.1 | 300 | 1083 | 140 |
| 12 | 196 | 99.6 | 96.0 | 300 | | 144[2] |
| 14 | 221 | 99.7 | 96.0 | 300 | 1120 | 135[2] |
| | weekend; no samples taken for 65 h | | | | | |
| 16 | 291 | 99.8 | 96.1 | 300 | | 418[2] |
| 18 | 315 | 99.9 | 95.5 | 305 | | 300[2] |
| 20 | 339 | 99.8 | 96.0 | 310 | | 100 |
| 22 | 363 | 99.5 | 95.6 | 310 | | 130 |
| 24 | 387 | 99.6 | 96.0 | 310 | | 100[2] |

[1]Result from a composite of Samples 1,2 and 4.
[2]Average value of 2 or more determinations.
[3]Even-numbered samples represent 4-hour balances taken during the working day.
[4]Liquid recoveries were 100 ± 1% and gas inlet rates equalled gas outlet rates within experimental error.

EXAMPLE 6

This run further demonstrates effective PNA removal from different reformates, the first a reformate, F3, prepared in a reforming pilot plant unit at low pressure, high recycle conditions during a testing program, and the second a reformate, F4, obtained from a commercial reforming unit. The run was begun using the F3 reformate as feed to the unit, and subsequently F4 reformate was cut into the unit. Analysis of these feedstocks are given in Table VII.

TABLE VII
Feedstock Inspections

| Type | Reformate | |
|---|---|---|
| ppm H₂O | 4 | |
| Cl | <0.1 | |
| S | <0.1 | |
| PNA (Test No. 2) | 800 | 2700 |
| d 60° F. (15.6° C.) g/cc | 0.7845 | 0.7967 |
| API Gravity | 48.8 | 46.1 |
| RONC | 95.4 | 103.3 |
| Wt. % Aromatics in $C_5^+$ | 65.5 | 80.8 |
| Molecular Weight | 99.2 | 99.2 |
| Composition, Wt. % | | |
| Iso-$C_4$ | 0.81 | 0.07 |
| n-$C_4$ | 1.47 | 0.59 |
| Iso-$C_5$ | 2.29 | 2.67 |
| n-$C_5$ | 1.60 | 2.15 |
| Iso-$C_6$ | 8.31 | 4.47 |
| n-$C_6$ | 4.10 | 1.87 |
| Iso-$C_7$ | 9.10 | 3.79 |
| n-$C_7$ | 2.47 | 1.00 |
| n-$C_8$ | 0.77 | 0.32 |
| $C_8$-$C_{10}$ HC | 4.86 | 1.91 |
| Benzene | 5.67 | 4.38 |
| Toluene | 15.54 | 18.97 |
| Ethyl Benzene | 4.04 | 5.21 |
| Xylenes | 16.51 | 23.33 |
| $C_9+$ Aromatics | 21.87 | 29.28 |

The reactor was loaded with 4.0 mL (10.0 g) of BASF-R fused iron catalyst in the 14–35 mesh range. No additional pretreat, other than that done by the manufacturer, was given to the catalyst prior to starting this run on oil. The feed rate was set at 20 mL/h to give an LHSV of 5.0.

The results given in Table VIII illustrate the effectiveness of the fused iron catalyst employed in an operating run, at the conditions given, to lower the PNA level in these reformates over a much longer period of time than in the run described by reference to Example 5.

TABLE VIII
PNA/Heavies Removal From Reformates Over Commercial Fused Iron Catalyst Catalyst: BASF-R
Pretreat: Prereduced by Catalyst Manufacturer
Conditions of Run: 140 psig, 2200 SCF/B, 1.5 W/H/W
Feed: F3, Balance Periods 00–66 (Start-of-Run)
F4, Balance Periods 68–182 (End-of-Run)

| Bal. No. | Hours On Oil | Temp. °C. | $C_5^+$ LV % | RONC | PNA Level Test No. 2 ppm[1] | Comment |
|---|---|---|---|---|---|---|
| 00 | 0 | — | — | — | 800 | Start-of-run (570° F.) |
| 02 | 23 | 299 | 98.6 | 95.3 | 250 | |
| 04 | 47 | 299 | 98.9 | 95.4 | 100 | |
| 06 | 72 | 303 | 99.3 | 95.5 | 50 | Raised Temperature to 303° C. (577° F.) |
| 08 | 143 | 307 | 99.1 | 95.3 | 25 | Raised Temperature to 307° C. (585° F.) |
| 10 | 167 | 307 | 98.3 | 95.4 | <25 | |
| 12 | 191 | 307 | 98.6 | 95.2 | <25 | |
| 14 | 215 | 307 | 98.4 | 95.9 | <25 | |
| 16 | 239 | 307 | 98.4 | 96.2 | <25 | |
| 18 | 311 | 306 | 98.7 | 96.3 | <25 | |
| 20 | 335 | 307 | 98.1 | 96.3 | <30 | |
| 22 | 359 | 307 | 98.8 | 96.3 | <25 | |
| 24 | 383 | 307 | 98.7 | 96.3 | <25 | |
| 26 | 407 | 306 | 98.9 | 96.1 | <25 | |
| 28 | 479 | 306 | 99.0 | 96.0 | <25 | |
| 30 | 503 | 307 | 98.7 | 96.0 | <25 | |
| 32 | 527 | 307 | 98.5 | 96.1 | <25 | |
| 34 | 551 | 307 | 98.6 | 95.9 | <25 | |
| 36 | 575 | 306 | 98.5 | 96.0 | <25 | |
| 38 | 647 | 304 | 99.1 | 96.0 | <25 | |
| 40 | 671 | 304 | 98.8 | 96.3 | <25 | |
| 42 | 694 | 307 | 98.5 | 96.0 | <25 | |
| 44 | 718 | 306 | 98.5 | 96.2 | <25 | |
| 46 | 742 | 307 | 98.7 | 96.2 | <25 | |
| 48 | 815 | 306 | 99.3 | 96.1 | <25 | |
| 50 | 838 | 307 | 99.2 | 96.1 | <25 | |
| 52 | 862 | 307 | 99.4 | 96.0 | <25 | |
| 54 | 886 | 307 | 99.4 | 96.1 | <25 | |
| 56 | 911 | 306 | 99.6 | 96.0 | <25 | |
| 58 | 983 | 306 | 99.5 | 96.0 | <25 | |
| 60 | 1007 | 306 | 99.8 | 96.1 | <25 | |
| 62 | 1031 | 307 | 99.7 | 96.0 | <25 | |
| 64 | 1054 | 308 | 100.1 | 95.6 | <25 | |
| 66 | 1079 | 307 | 99.6 | 96.0 | <25 | Switched to F4 |
| 68 | 1128 | 307 | 100.5 | 100.4 | — | |
| 70 | 1151 | 304 | 99.7 | 102.2 | — | Lowered Temperature to 304° C. (579° F.) |
| 72 | 1246 | 302 | 98.7 | 103.3 | 50 | |
| 74 | 1270 | 302 | 99.0 | 103.3 | 30 | |
| 76 | 1294 | 303 | 99.3 | 103.4 | 105 | |
| 78 | 1318 | 309 | 99.0 | 103.4 | 165 | Raised Temperature to 309° C. (588° F.) |
| 80 | 1390 | 310 | 99.2 | 103.4 | 220 | |
| 82 | 1415 | 309 | 99.3 | 103.3 | 130 | |
| 84 | 1439 | 309 | 99.3 | 103.4 | 130 | |
| 86 | 1463 | 310 | 98.8 | 103.5 | 300 | |
| 88 | 1486 | 311 | 98.9 | 103.2 | 260 | |
| 90 | 1559 | 309 | 99.3 | 103.5 | 300 | |
| 92 | 1582 | 310 | 99.3 | 103.4 | 320 | |
| 94 | 1607 | 316 | 99.1 | 103.2 | 50 | Raised Temperature to 316° C. (601° F.) |
| 96 | 1631 | 315 | 99.1 | 103.5 | 70 | |
| 98 | 1655 | 316 | 99.0 | 103.5 | 115 | |
| 100 | 1727 | 316 | 98.9 | 103.4 | 195 | |
| 102 | 1751 | 316 | 98.9 | 103.5 | 115 | |

TABLE VIII-continued

PNA/Heavies Removal From Reformates
Over Commercial Fused Iron Catalyst

Catalyst: BASF-R
Pretreat: Prereduced by Catalyst Manufacturer
Conditions of Run: 140 psig, 2200 SCF/B, 1.5 W/H/W
Feed: F3, Balance Periods 00–66 (Start-of-Run)
F4, Balance Periods 68–182 (End-of-Run)

| Bal. No. | Hours On Oil | Temp. °C. | $C_5^+$ LV % | RONC | PNA Level Test No. 2 ppm[1] | Comment |
|---|---|---|---|---|---|---|
| 104 | 1775 | 316 | 98.9 | 103.4 | 260 | |
| 106 | 1799 | 316 | 98.9 | 103.6 | 215 | |
| 108 | 1822 | 316 | 99.1 | 103.3 | 160 | |
| 110 | 1895 | 315 | 99.3 | 103.3 | 300 | |
| 112 | 1919 | 315 | 99.2 | 103.5 | 480 | |
| 114 | 1943 | 316 | 99.0 | 103.6 | 525 | |
| 116 | 1967 | 316 | 98.5 | 103.6 | 460 | |
| 118 | 1991 | 321 | 98.8 | 103.4 | — | Raised Temperature to 321° C. (610° F.) |
| 120 | 2063 | 324 | 99.0 | 103.6 | 60 | Raised Temperature to 324° C. (615° F.) |
| 122 | 2087 | 324 | 98.8 | 103.5 | 60 | $H_2$ strip at 325° C. (617° F.) For 17 hr. Lowered Temperature to 316° C. (601° F.) |
| 124 | 2094 | 315 | 99.4 | 103.4 | <25 | |
| 126 | 2118 | 314 | 98.6 | 103.5 | 60 | |
| 128 | 2142 | 314 | 98.6 | 103.5 | 115 | |
| 130 | 2213 | 314 | 98.6 | 103.6 | 260 | |
| 132 | 2239 | 314 | 98.7 | 103.5 | 150 | |
| 134 | 2263 | 314 | 99.0 | 103.5 | 205 | |
| 136 | 2286 | 314 | 99.4 | 103.5 | 220 | |
| 138 | 2310 | 314 | 99.3 | 103.3 | 280 | |
| 140 | 2406 | 314 | 99.2 | 103.5 | — | |
| 142 | 2430 | 319 | 99.2 | 103.6 | 245 | Raised Temperature to 318° C. (604° F.) |
| 144 | 2454 | 319 | 99.3 | 103.4 | 255 | |
| 146 | 2478 | 319 | 99.0 | 103.1 | 325 | |
| 148 | 2550 | 319 | 98.9 | 103.5 | 215 | |
| 150 | 2574 | 325 | 98.9 | 103.4 | 80 | Raised Temperature to 325° C. (617° F.) |
| 152 | 2599 | 325 | 99.1 | 103.4 | 60 | |
| 154 | 2622 | 325 | 99.0 | 103.5 | 75 | |
| 156 | 2646 | 325 | 99.0 | 103.4 | 60 | |
| 158 | 2718 | 325 | 99.3 | 103.4 | 80 | |
| 160 | 2742 | 325 | 99.6 | 103.2 | 115 | |
| 162 | 2766 | 325 | 98.7 | 103.6 | 130 | |
| 164 | 2790 | 325 | 98.8 | 103.4 | 115 | |
| 166 | 2814 | 325 | 98.7 | 103.5 | 120 | |
| 168 | 2887 | 325 | 99.3 | 103.6 | 100 | |
| 170 | 2910 | 325 | 99.4 | 103.2 | 150 | |
| 172 | 2934 | 325 | 99.1 | 103.6 | 190 | |
| 174 | 2958 | 325 | 99.2 | 103.5 | 240 | |
| 176 | 2982 | 325 | 99.1 | 103.6 | 195 | |
| 178 | 3054 | 325 | 99.2 | 103.6 | 240 | |
| 180 | 3078 | 325 | 99.5 | 103.5 | 240 | |
| 182 | 3100 | 327 | 99.0 | 103.6 | — | End-of-Run |

[1] In recording a level of PNAs as <25, the actual reading was 0. However, since the accuracy of PNA Test No. 2 was determined to be about ±25 ppm, these readings were recorded as <25.

Good operation was achieved over the entire length of the run (129 days), the data typically showing ≧90% PNA removal. Temperature increases were made during the run to maintain the activity of the catalyst, this being a commonly used method in fixed bed catalytic operations. The catalyst activity, it will be observed, was also successfully recovered by hydrogen treats made during the on-oil run. (Note sequence of events between and results for balances 116 and 124.)

It is apparent that various modifications and changes can be made without departing the spirit and scope of the invention.

Having described the invention, what is claimed is:

1. A process for removing polynuclear aromatic hydrocarbons from a feed characterized as a molecular admixture of polynuclear aromatic hydrocarbon-containing hydrocarbons having a high end boiling point below about 540° C. (1004° F.) a sulfur level below about 5000 ppm, and nitrogen level below about 5000 ppm which comprises:

contacting said feed, in the presence of hydrogen, over a catalyst comprised of elemental iron and one or more alkali or alkaline-earth metals components at a temperature ranging from about 225° C. (437° F.) to about 430° C. (806° F.) and hydrogen partial pressure ranging from about 0 psig to about 1000 psig sufficient to hydrogenate and hydrocrack the polynuclear aromatic hydrocarbon molecules of the molecular hydrocarbon admixture without excessively hydrogenating and hydrocracking the non-polynuclear aromatic hydrocarbon molecules of said feed.

2. The process of claim 1 wherein the feed is derived from a petroleum or synthetic hydrocarbon source, and the feed has a high end boiling point below about 375° C. (707° F.).

3. The process of claim 1 wherein the feed is derived from a petroleum or synthetic hydrocarbon source, and the feed has a high end boiling point below about 225° C. (437° F.).

4. The process of claim 1 wherein the feed is a processed reformate suitable as a motor gasoline blending stock.

5. The process of claim 1 wherein the feed has a sulfur level below about 2000 ppm, and a nitrogen level below about 2000 ppm.

6. The process of claim 1 wherein the feed has a sulfur level below about 500 ppm, and a nitrogen level below about 500 ppm.

7. The process of claim 1 wherein the feed is a processed reformate suitable as a motor gasoline blending stock, has a sulfur level below about 200 ppm, and a nitrogen level below about 200 ppm.

8. The process of claim 7 wherein the feed has a sulfur level below about 20 ppm, and a nitrogen level below about 20 ppm.

9. The process of claim 1 wherein the iron catalyst with which the feed and hydrogen are contacted at reaction conditions is a bulk iron catalyst, and contains at least 70 percent to about 98 percent elemental iron.

10. The process of claim 9 wherein the catalyst with which the feed and hydrogen are contacted at reaction conditions is a fused iron catalyst.

11. The process of claim 9 wherein the catalyst with which the feed and hydrogen are contacted at reaction conditions contains one or more alkali or alkaline-earth metals in concentrations ranging from about 0.01 percent to about 10 percent.

12. The process of claim 1 wherein the iron catalyst with which the feed and hydrogen are contacted at reaction conditions is a supported iron catalyst, and contains from about 70 percent to about 98 percent iron, exclusive of the support component, or components.

13. The process of claim 12 wherein the supported iron catalyst, with which the feed and hydrogen are contacted at reaction conditions, contains one or more alkali or alkaline-earth metals in concentration ranging from about 0.01 percent to about 10 percent, and aluminum in concentration ranging from about 0.01 percent to about 20 percent, as aluminum oxide.

14. The process of claim 1 wherein the temperature of the reaction ranges from about 250° C. (482° F.) to about 350° C. (662° F.).

15. The process of claim 1 wherein the hydrogen partial pressure ranges from about 100 psig to about 600 psig.

16. The process of claim 1 wherein the catalyst is characterized as
a bulk iron catalyst which contains at least 50 percent elemental iron, based on the weight of the catalyst, and the catalyst is modified with one or more alkali or alkaline-earth metals.

17. The process of claim 1 wherein the catalyst is characterized as an iron catalyst wherein the iron is dispersed upon an inorganic oxide support, the catalyst containing at least about 0.1 percent iron, based on the total weight of the catalyst, the supported metallic component containing at least 50 percent iron, exclusive of the support component, or components, of the catalyst, and the iron contains one or more alkali or alkaline-earth metals.

18. The process of claim 1 wherein the iron catalyst with which the feed and hydrogen are contacted at reaction conditions is a supported iron catalyst, and contains at least 0.1 percent iron, based on the total weight of the catalyst.

19. The process of claim 17 wherein the catalyst contains from about 0.1 percent to about 50 percent iron.

20. The process of claim 17 wherein the catalyst contains from about 5 percent to about 25 percent iron.

21. The process of claim 18 wherein the supported iron catalyst, with which the feed and hydrogen are contacted at reaction conditions, contains one or more alkali or alkaline-earth metals in concentration ranging from about 0.01 percent to about 10 percent, and aluminum in concentration ranging from about 0.01 percent to about 20 percent, as aluminum oxide.

22. A process for removing polynuclear aromatic hydrocarbons from a polynuclear aromatic hydrocarbon-containing liquid reformate feed boiling within a range of from about 25° C. to about 225° C. which comprises:
contacting said feed, in the presence of hydrogen, over a catalyst comprised of elemental iron and one or more alkali or alkaline-earth metals components at a temperature ranging from about 225° C. to about 430° C. and hydrogen partial pressure ranging from about 0 psig to about 1000 psig sufficient to hydrogenate and hydrocrack the polynuclear aromatic hydrocarbon molecules of the feed without excessively hydrogenating and hydrocracking the nonpolynuclear aromatic hydrocarbon molecules of said feed.

23. The process of claim 22 wherein the feed has a sulfur level below about 500 ppm, and a nitrogen level below about 500 ppm.

24. The process of claim 22 wherein the feed has a sulfur level below about 200 ppm, and a nitrogen level below about 200 ppm.

25. The process of claim 22 wherein the feed has a sulfur level below about 20 ppm, and a nitrogen level below about 20 ppm.

26. The process of claim 22 wherein the catalyst with which the feed and hydrogen are contacted at reaction conditions is a fused iron catalyst which contains one or more alkali or alkaline-earth metals in concentrations ranging from about 0.01 percent to about 10 percent.

27. The process of claim 22 wherein the iron catalyst with which the feed and hydrogen are contacted at reaction conditions is a supported iron catalyst, and contains at least 0.1 percent iron, based on the total weight of the catalyst, and alkali or alkaline-earth metals in concentration ranging from about 0.01 percent to about 10 percent.

* * * * *